(12) United States Patent
Atkins-Barratt et al.

(10) Patent No.: US 10,308,542 B2
(45) Date of Patent: Jun. 4, 2019

(54) APPARATUS AND METHOD FOR REFORMING SHEET MATERIAL

(71) Applicant: CORNING INCORPORATED, Corning, NY (US)

(72) Inventors: Frédéric Atkins-Barratt, Vaux le Penil (FR); Jean-Luc Dabouineau, Nemours (FR); Jean-Pierre Henri René Lereboullet, Bois le Roi (FR)

(73) Assignee: CORNING INCORPORATED, Corning, NY (US)

( * ) Notice: Subject to any disclaimer, the term of this patent is extended or adjusted under 35 U.S.C. 154(b) by 164 days.

(21) Appl. No.: 15/189,457

(22) Filed: Jun. 22, 2016

(65) Prior Publication Data

US 2016/0376184 A1    Dec. 29, 2016

Related U.S. Application Data

(60) Provisional application No. 62/185,094, filed on Jun. 26, 2015.

(51) Int. Cl.
| | | |
|---|---|---|
| *C03B 23/027* | (2006.01) | |
| *C03B 23/037* | (2006.01) | |
| *C03B 23/035* | (2006.01) | |
| *B29C 51/26* | (2006.01) | |
| *B29C 51/10* | (2006.01) | |

(52) U.S. Cl.
CPC .......... *C03B 23/037* (2013.01); *B29C 51/262* (2013.01); *C03B 23/0352* (2013.01); *B29C 51/10* (2013.01); *B29C 2791/006* (2013.01); *B29C 2791/007* (2013.01)

(58) Field of Classification Search
CPC .............. C03B 23/035; C03B 23/0352; C03B 23/0355; C03B 23/0357
USPC .......................................................... 65/106
See application file for complete search history.

(56) References Cited

U.S. PATENT DOCUMENTS

| | | | | |
|---|---|---|---|---|
| 1,589,654 | A | * | 6/1926 | Murdock ................ C03B 13/14 264/DIG. 78 |
| 2,395,727 | A | * | 2/1946 | Devol ................. C03B 23/0302 406/89 |

(Continued)

FOREIGN PATENT DOCUMENTS

| | | |
|---|---|---|
| CN | 101850623 A | 10/2010 |
| CN | 202560000 U | 11/2012 |

(Continued)

OTHER PUBLICATIONS

International Search Report and Written Opinion PCT/US2016/038671 dated Aug. 30, 2016.

*Primary Examiner* — Jason L Lazorcik
(74) *Attorney, Agent, or Firm* — Timothy M. Schaeberle (57) ABSTRACT

A mold has a sealing surface bearing a sealing profile. A plenum has a sealing surface bearing a sealing profile. The mold and plenum together form an apparatus for reforming a sheet material. In the closed position of the apparatus, the sealing profile of the mold is in opposing relation to the sealing profile of the plenum and the sealing profiles of the mold and plenum together define a profiled sealing gap. When the sheet material is wedged into the profiled sealing gap, a direct seal will be formed between the sheet material and each of the mold and plenum, resulting in two forming areas within the apparatus.

9 Claims, 11 Drawing Sheets

(56) References Cited

U.S. PATENT DOCUMENTS

| | | | | |
|---|---|---|---|---|
| 2,699,014 | A | * | 1/1955 | Van Steenis .......... C03B 23/023 220/2.1 A |
| 3,007,206 | A | * | 11/1961 | Griswold ................ B29C 51/10 264/249 |
| 3,193,367 | A | * | 7/1965 | Giffen ..................... C03B 21/02 425/292 |
| 3,223,501 | A | | 12/1965 | Fredley et al. |
| 3,375,093 | A | | 3/1968 | Reising |
| 3,468,645 | A | | 9/1969 | McMaster et al. |
| 3,528,791 | A | * | 9/1970 | Giffen ................ C03B 23/0357 264/553 |
| 3,552,941 | A | * | 1/1971 | Giffen ..................... B29C 67/00 65/177 |
| 3,582,454 | A | * | 6/1971 | Giffen ........................ C03B 9/12 428/130 |
| 3,665,730 | A | | 5/1972 | Linzer |
| 3,723,085 | A | | 3/1973 | McMaster |
| 4,191,039 | A | * | 3/1980 | Bradbury ................ B29C 49/66 264/544 |
| 4,204,845 | A | | 5/1980 | Shields et al. |
| 4,210,433 | A | * | 7/1980 | Andrysick ................ C03B 7/00 65/127 |
| 4,313,746 | A | * | 2/1982 | Juras ................... C03B 23/0258 65/106 |
| 4,361,429 | A | * | 11/1982 | Anderson ................ C03B 11/06 65/177 |
| 4,865,639 | A | | 9/1989 | Kudo |
| 4,952,227 | A | | 8/1990 | Herrington et al. |
| 5,004,491 | A | * | 4/1991 | McMaster ............... C03B 23/03 65/104 |
| 5,324,373 | A | | 6/1994 | Gillner et al. |
| 5,376,158 | A | * | 12/1994 | Shetterly ................ C03B 23/03 65/106 |
| 5,383,947 | A | * | 1/1995 | Montonen ............ C03B 23/035 65/106 |
| 5,573,566 | A | * | 11/1996 | Anderberg .......... C03B 23/0256 425/110 |
| 5,992,178 | A | * | 11/1999 | Kuster ................ C03B 23/0357 65/106 |
| 6,336,775 | B1 | | 1/2002 | Morita et al. |
| 6,363,751 | B1 | | 4/2002 | Hirotusu et al. |
| 6,505,483 | B1 | | 1/2003 | Hoetzl et al. |
| 7,313,939 | B2 | * | 1/2008 | Nobata ................ B21D 22/205 29/421.1 |
| 7,401,476 | B2 | | 7/2008 | Fukami et al. |
| 7,437,892 | B2 | * | 10/2008 | Siskos ................ C03B 23/0252 65/106 |
| 7,614,270 | B2 | * | 11/2009 | Luckey, Jr. .......... B21D 26/055 29/421.1 |
| 8,468,850 | B2 | | 6/2013 | Fukami et al. |
| 8,573,005 | B2 | | 11/2013 | Dannoux et al. |
| 9,221,705 | B2 | * | 12/2015 | Langsdorf ........... C03B 23/0258 |
| 9,382,146 | B2 | * | 7/2016 | Chang ................. C03B 23/0357 |
| 9,938,179 | B2 | * | 4/2018 | Immerman ........ C03B 23/0357 |
| 9,975,800 | B2 | * | 5/2018 | Dannoux ............ C03B 23/0258 |
| 2004/0107729 | A1 | | 6/2004 | Fukami et al. |
| 2005/0061034 | A1 | * | 3/2005 | Boisselle ................ C03B 23/03 65/169 |
| 2007/0018360 | A1 | | 1/2007 | Brant et al. |
| 2008/0079199 | A1 | | 4/2008 | Wykoff et al. |
| 2008/0190143 | A1 | | 8/2008 | Balduin et al. |
| 2009/0302511 | A1 | * | 12/2009 | Akilian .................... B29C 51/10 264/544 |
| 2010/0077798 | A1 | * | 4/2010 | Fredholm ........... C03B 23/0252 65/64 |
| 2011/0205485 | A1 | * | 8/2011 | Sonzogni .......... B29C 43/3642 351/124 |
| 2012/0144866 | A1 | * | 6/2012 | Liu ..................... C03B 23/0302 65/104 |
| 2012/0216573 | A1 | * | 8/2012 | Dannoux ............ C03B 23/0258 65/104 |
| 2013/0081428 | A1 | * | 4/2013 | Liu ......................... C03B 40/00 65/106 |
| 2014/0234581 | A1 | * | 8/2014 | Immerman ......... C03B 23/0357 428/141 |
| 2015/0203394 | A1 | | 7/2015 | Ukrainczyk et al. |
| 2017/0283295 | A1 | * | 10/2017 | Immerman ........ C03B 23/0235 |
| 2018/0125756 | A1 | * | 5/2018 | Gerrish ................ A61J 1/1468 |
| 2018/0134602 | A1 | * | 5/2018 | Immerman ......... C03B 23/0357 |

FOREIGN PATENT DOCUMENTS

| | | |
|---|---|---|
| DE | 102008009438 A1 | 8/2009 |
| EP | 241355 A1 | 10/1987 |
| EP | 298425 B1 | 1/1989 |
| EP | 425663 B1 | 5/1991 |
| EP | 541522 B1 | 12/1996 |
| JP | 2003137566 A | 5/2003 |
| JP | 0501365182 | 8/2012 |
| JP | 0541529182 | 2/2014 |
| WO | 1991017962 A1 | 11/1991 |
| WO | 1996035572 A1 | 11/1996 |
| WO | 1998019794 A1 | 5/1998 |
| WO | 2001062680 A1 | 8/2001 |
| WO | 2010002446 A1 | 1/2010 |
| WO | 2010061238 A1 | 6/2010 |
| WO | 2010065371 A1 | 6/2010 |
| WO | 2012118612 A1 | 9/2012 |

* cited by examiner

APPARATUS AND METHOD FOR REFORMING SHEET MATERIAL

CROSS-REFERENCE TO RELATED APPLICATIONS

This application claims the benefit of priority under 35 U.S.C. § 119 of U.S. Provisional Application Ser. No. 62/185,094 filed on Jun. 26, 2015 the content of which is relied upon and incorporated herein by reference in its entirety.

BACKGROUND

When reforming a glass sheet into a three-dimensional (3D) shape at a relatively low temperature and/or when the 3D shape to be formed is relatively complex, it is often necessary to assist the shaping of the glass sheet with force. In general, this force may be in the form of vacuum applied to the pull the glass sheet to a mold surface (vacuum forming) or a plunger used to press the glass sheet to a mold surface (press molding) or pressurized gas used to force the glass sheet against a mold surface (pressure forming). In some cases, any of these forming methods alone may not fully form the 3D shape or may form the 3D shape with great difficulty.

SUMMARY

An apparatus that enables both vacuum forming and pressure forming of a sheet material in a single forming process is disclosed. A method of forming a sheet material by vacuum and pressure is also disclosed. In general, the apparatus includes a mold and a plenum, each of which has a sealing profile for forming a direct seal with a sheet material. When the sheet material is disposed between the mold and plenum, a direct seal is formed between the mold and sheet material, thereby creating a first forming area on one side of the sheet material. Simultaneously, a direct seal is formed between the sheet material and plenum, thereby creating a second forming area on another side of the sheet material. If vacuum is provided in the first forming area and pressure is provided in the second forming area, the sheet material can be formed into a desired shape within the same apparatus using both vacuum and pressure.

In a first aspect, an apparatus for reforming a sheet material includes a mold having a first sealing surface including a first sealing profile; and a plenum having a second sealing surface including a second sealing profile, the plenum and mold being movable to a closed position in which the first sealing profile and the second sealing profile are in opposed relation and together define a profiled sealing gap between the first and second sealing surfaces. When the sheet material is wedged into the profiled sealing gap in the closed position of the plenum and mold, a first direct seal is formed between the first sealing profile and the sheet material and a second direct seal is formed between the second sealing profile and the sheet material.

In a second aspect according to the first aspect, wherein one of the first and second sealing profiles is in the form of a groove in the respective sealing surface and the other of the first and second sealing profiles is in the form of a bump in the respective sealing surface.

In a third aspect according the first or second aspect, wherein there is no interference between the first and second sealing profiles in the closed position of the plenum and mold.

In a fourth aspect according to the third aspect, wherein there is a gap between the first and second sealing surfaces in the closed position of the plenum and mold, and wherein a height of the gap is selected such that there is no interference between the first and second sealing profiles in the closed position of the plenum and mold.

In a fifth aspect according to the fourth aspect, wherein at least one of the plenum and mold comprises a rim circumscribing a respective one of the first and second sealing surfaces, and wherein the height of the gap is set by the height of the rim.

In a sixth aspect according to any one of the first through fifth aspects, wherein a first forming area is defined adjacent to the mold and a second forming area is defined adjacent to the plenum in the closed position of the plenum and mold.

In a seventh aspect according to the sixth aspect, wherein the first direct seal seals a periphery of the first forming area, and wherein the second direct seal seals a periphery of the second forming area.

In an eighth aspect according to the seventh aspect, wherein the mold comprises a first flow network for drawing vacuum from the first forming area, and wherein the plenum comprises a second flow network for feeding pressurized gas to the second forming area.

In a ninth aspect according to the seventh aspect, wherein the first sealing profile comprises an opening in communication with the first flow network.

In tenth aspect according to any one of the first through tenth aspects, wherein each of the first and second profiles has a triangular, round, square, or rectangular cross-sectional shape.

In an eleventh aspect, a method of reforming a sheet material includes creating a first forming area adjacent to a mold by forming a first direct seal between the sheet material and a first sealing surface of the mold using a first sealing profile on the first sealing surface; creating a second forming area adjacent to a plenum by forming a second direct seal between the sheet material and a second sealing surface of the plenum using a second sealing profile on the second sealing surface; vacuum forming the sheet material by pulling the sheet material against a surface of the mold using vacuum drawn from the first forming area through the mold; and pressure forming the sheet material by forcing the sheet material against the mold surface using pressurized gas fed to the second forming area through the plenum.

In a twelfth aspect according to the eleventh aspect, wherein the first direct seal and second direct seal are formed by closing the mold against the plenum such that the first sealing profile is in opposing relation to the second sealing profile and the first and second sealing profiles together form a profiled sealing gap, and wherein the sheet material is wedged in the profiled sealing gap to form the first direct seal and the second direct seal.

In a thirteenth aspect according the eleventh or twelfth aspect, further comprising reinforcing the first direct seal by drawing the sheet material against the first sealing profile by vacuum.

In a fourteenth aspect according to any one of the eleventh through thirteenth aspects, wherein the vacuum forming and pressure forming are performed simultaneously.

In a fifteenth aspect according to any one of the eleventh through fourteenth aspects, wherein the sheet material is made of glass or glass-ceramic.

In a sixteenth aspect according to any one of the eleventh through fifteenth aspects, wherein one of the first and second sealing profiles is in the form of a groove in the respective sealing surface and the other of the first and second sealing profiles is in the form of a bump in the respective sealing surface.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1A:
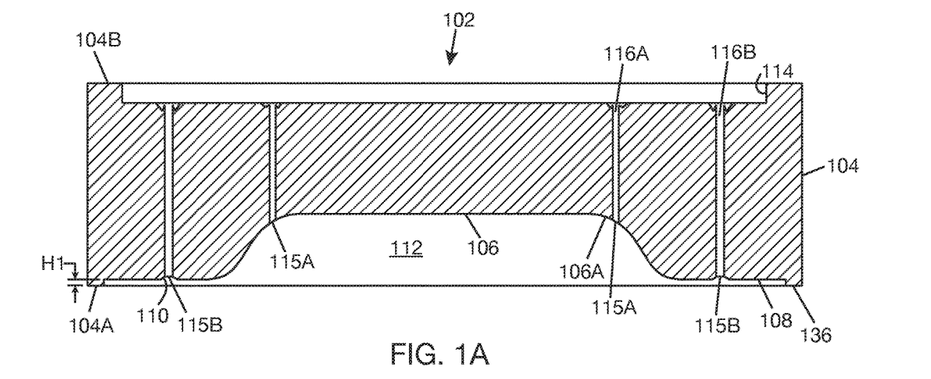
FIG. 1A shows a cross-section of a mold.
Figure 1B:
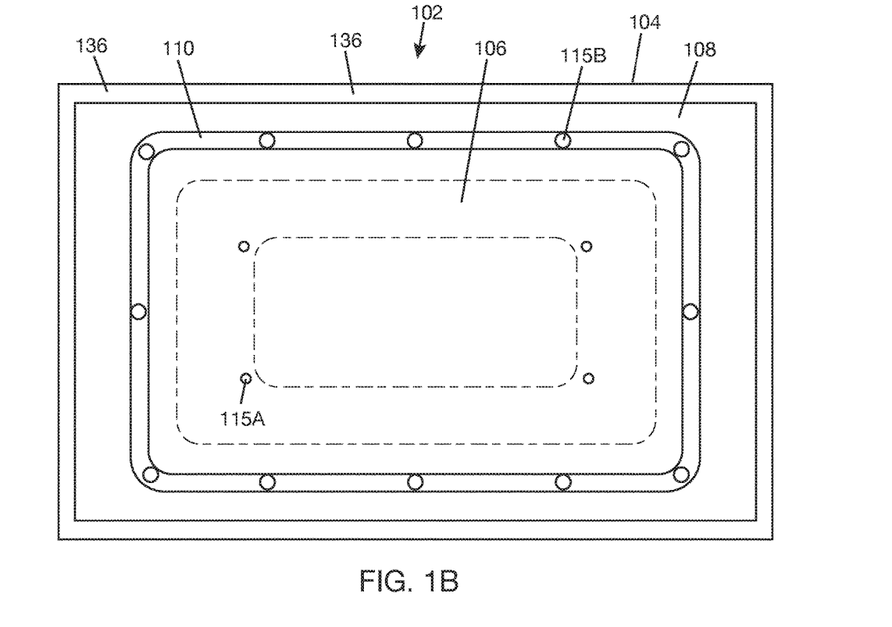
FIG. 1B shows a top view of the mold of FIG. 1A.

FIGS. 1A and 1B show a mold 102 having a mold body 104. One side 104A of the mold body 104 includes a mold surface 106 and a sealing surface 108. The mold surface 106 has a surface profile defining a mold cavity 112. The surface profile is determined by the shape of an article to be formed by the mold 102. The sealing surface 108 circumscribes the mold surface 106. The side 104A of the mold body 104 may include a rim 136 of a select height, H1, circumscribing the sealing surface 108. The sealing surface 108 includes a sealing profile 110. The sealing profile 110 may have a ring shape circumscribing the mold surface 106, as shown in FIG. 1B. In one embodiment, such as shown in FIGS. 1A and 1B, the sealing profile 110 forms a groove in the sealing surface 108. The cross-sectional profile and depth (into the mold body 104) of the groove can be selected to achieve a desired sealing performance.

The other side 104B of the mold body 104 includes a chamber 114. Openings 115A, 115B are provided on the mold surface 106 and sealing surface 108, respectively, and channels 116A, 116B connect these openings to the chamber 114. The openings 115A, 115B may be holes or slots. In one embodiment, at least one opening 115B is located within the sealing profile 110 (e.g., if the sealing profile 110 forms a groove, the opening 115B may be located at the base of the groove). In one embodiment, at least one opening 115A is located in a corner area 106A (or other area with tight curvature) of the mold surface 106. Since the chamber 114 is in communication with the openings 115A, 115B through the channels 116A, 116B, respectively, vacuum can be drawn through the openings 115A, 115B by connecting the chamber 114 to a vacuum source or pump (not shown).

Figure 2A:
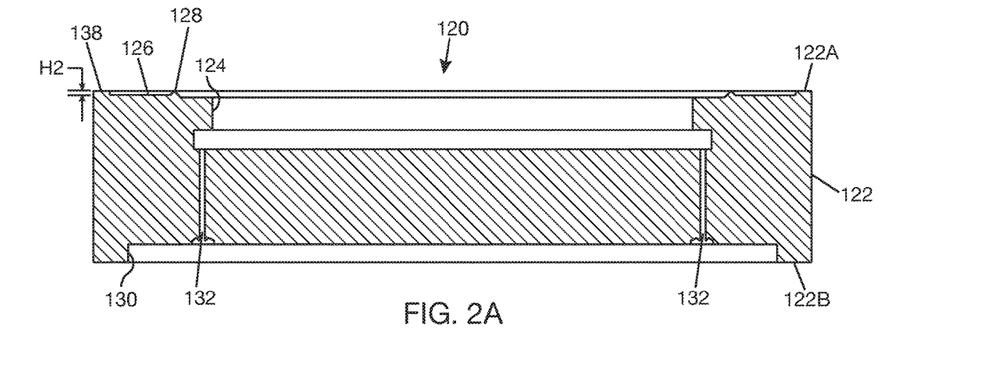
FIG. 2A shows a cross-section of a plenum.
Figure 2B:
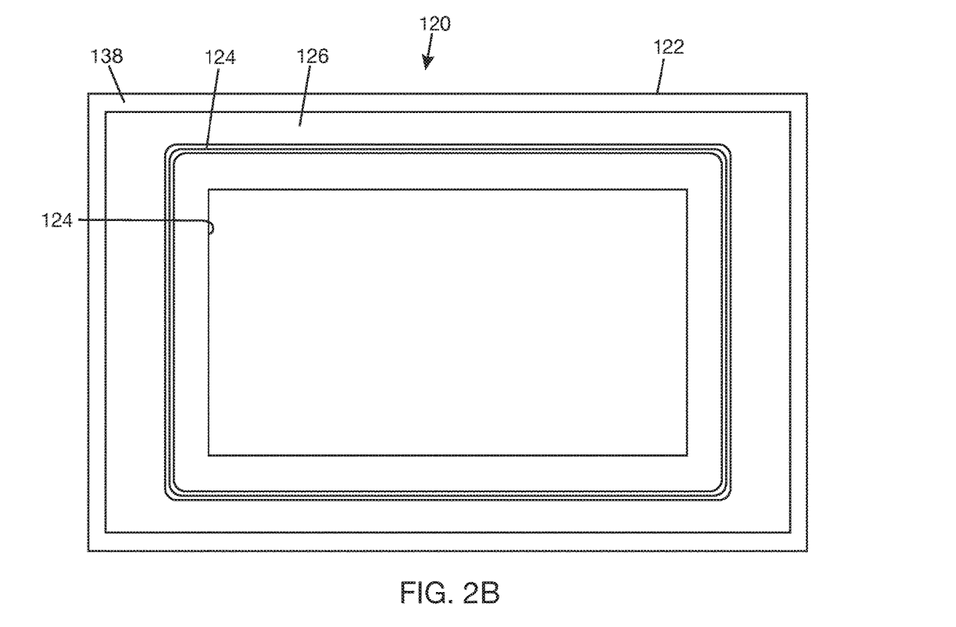
FIG. 2B shows a top view of the plenum of FIG. 2A.

FIGS. 2A and 2B show a plenum 120 having a plenum body 122. One side 122A of the plenum body 122 includes an upper chamber 124 and a sealing surface 126. The sealing surface 126 circumscribes the upper chamber 124. The side 122A of the plenum body 122 may include a rim 138 of a select height, H2, circumscribing the sealing surface 126. The sealing surface 126 includes a sealing profile 128. The sealing profile 128 may have a ring shape circumscribing the upper chamber 124, as shown in FIG. 2B. In one embodiment, the sealing profile 128 forms a bump on the sealing surface 126. The cross-sectional profile and height (above the sealing surface 126) of the bump can be selected to achieve a desired sealing performance.

As shown in FIG. 2A, the other side 122B of the plenum body 122 includes a lower chamber 130. The chambers 124 and 130 communicate through one or more channels 132 in the plenum body 122. The opening of the channel(s) 132 at the chambers 124, 130 may be in the form of holes or slots. Since the lower chamber 130 is in communication with the upper chamber 124 through the channels 132, pressurized gas can be fed into the upper chamber 124 by connecting the lower chamber 130 to a pressurized gas source (not shown).

Figure 3A:
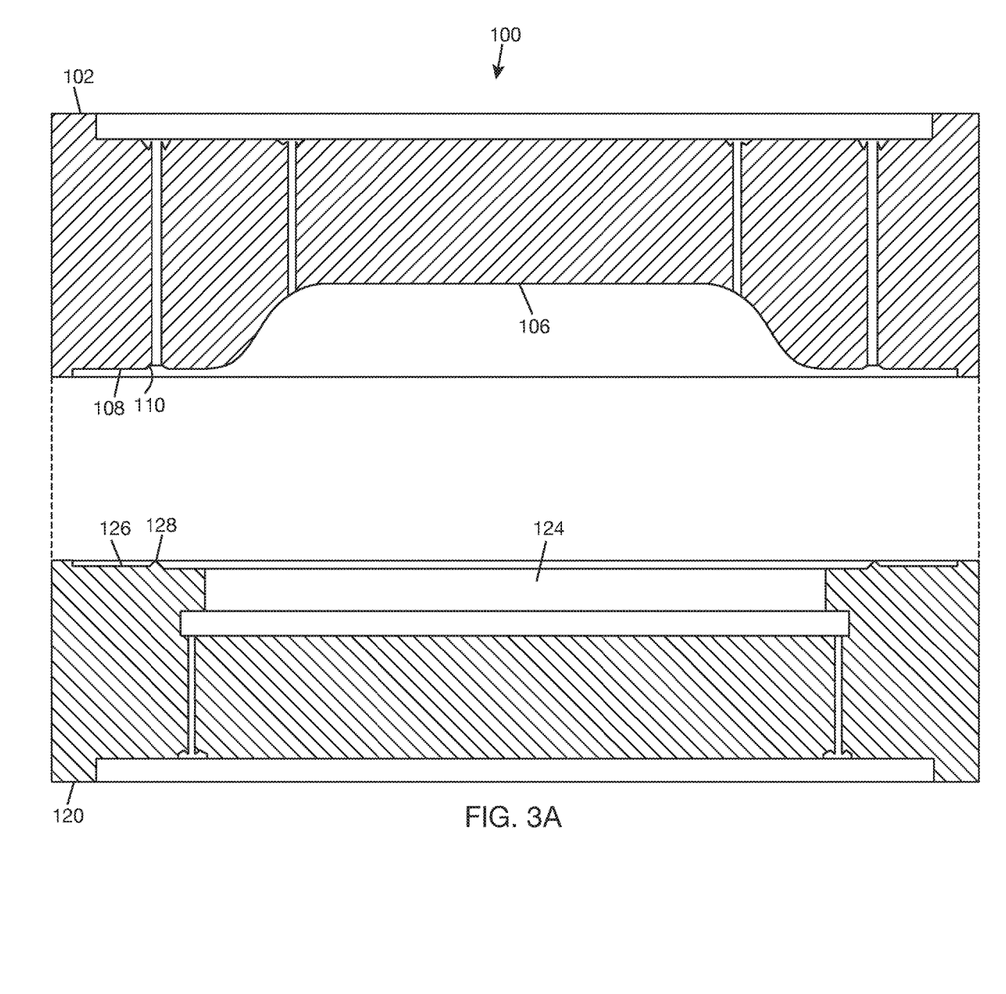
FIG. 3A shows a reforming apparatus in an open position.
Figure 3B:
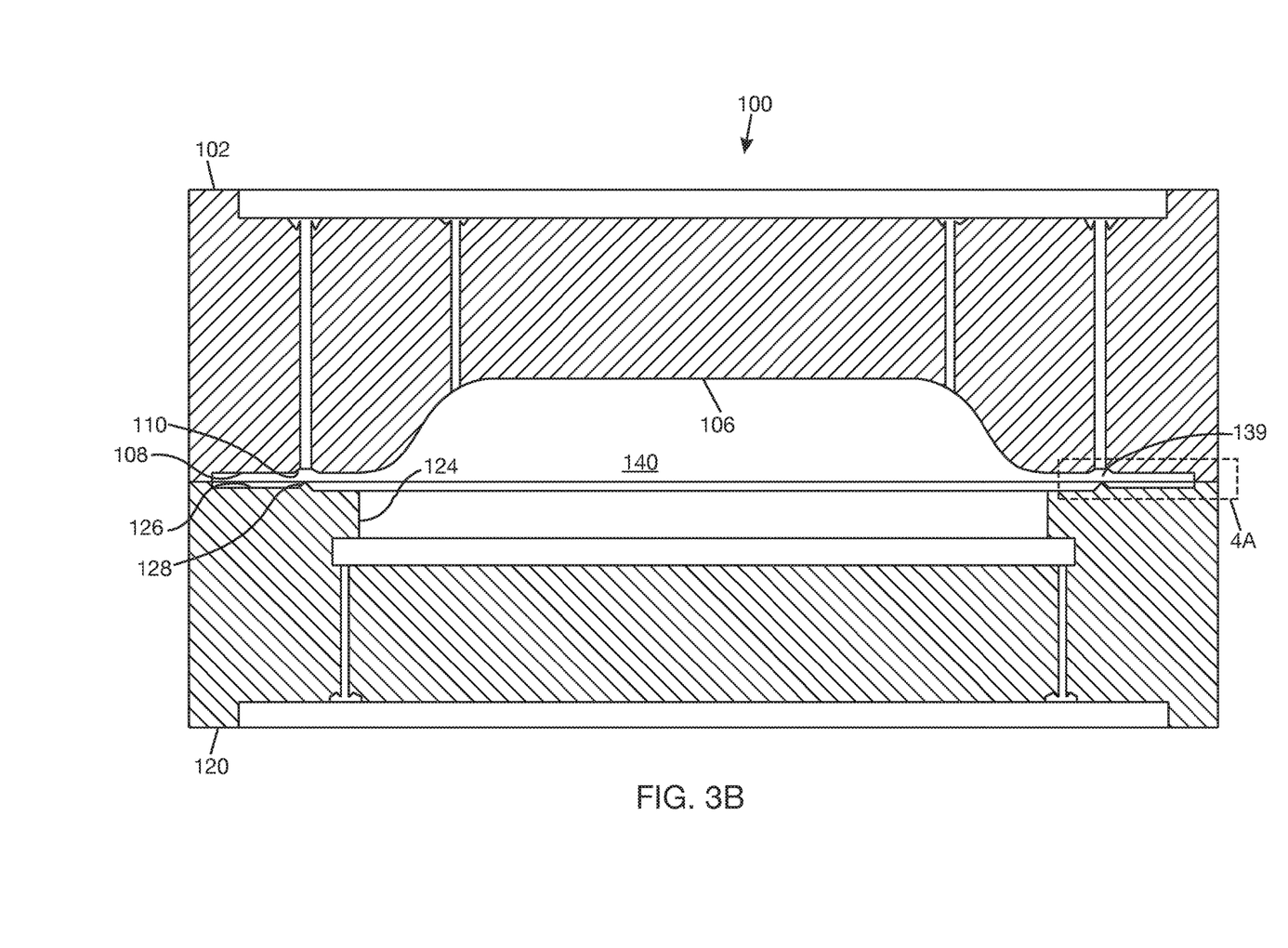
FIG. 3B shows a reforming apparatus in a closed position.

FIGS. 3A and 3B show a reforming apparatus 100 for forming a sheet material into a 3D shape. The reforming apparatus 100 includes the mold 102 and plenum 120 as described above. The mold 102 is supported in opposing relation to the plenum 120, with the sealing surface 108 of the mold 102 facing the sealing surface 126 of the plenum 120, and with the mold surface 106 of the mold 102 facing the upper chamber 124 of the plenum 120. The reforming apparatus 100 has an open position where the mold 102 is separated from the plenum 120, as shown in FIG. 3A, and a closed position where the mold 102 is closed against the plenum 120, as shown in FIG. 3B. Either or both of the mold 102 and plenum 120 can be moved to change the position of the reforming apparatus 100 between the open position and the closed position. The reforming apparatus 100 also has a forming state, when a sheet material is received between the sealing surfaces 108, 126, and a non-forming state, when a sheet material is not received between the sealing surfaces 108, 126.

In the closed position shown in FIG. 3B, the sealing profile 110 on the mold's sealing surface 108 is in opposing relation to the sealing profile 128 on the plenum's sealing surface 126. Together, the opposed sealing profiles 110, 128 create a profiled sealing gap 139 between the sealing surfaces 108, 126. The term "profiled sealing gap," as used herein, means a gap defined by profiled or shaped (3D) surfaces. In this case, the profiled sealing gap 139 is defined by the 3D shapes of the sealing profile 110 and sealing profile 128. In general, the profiled sealing gap 139 may have a folded or bent shape, e.g., a U or inverted U shape.

In the embodiment shown in FIG. 3B, the sealing profile 110 forms a groove in the mold's sealing surface 108, and the sealing profile 128 forms a bump on the plenum's sealing surface 126. In another embodiment, the sealing profile 110 may form a bump on the mold's sealing surface 108 and the sealing profile 128 may form a groove in the plenum's sealing surface 126 without changing the general nature of the profiled sealing gap 139. In this alternate embodiment, the positions of the mold 102 and plenum 120 may be reversed such that the mold 102 is below the plenum 120.

Figure 4A:
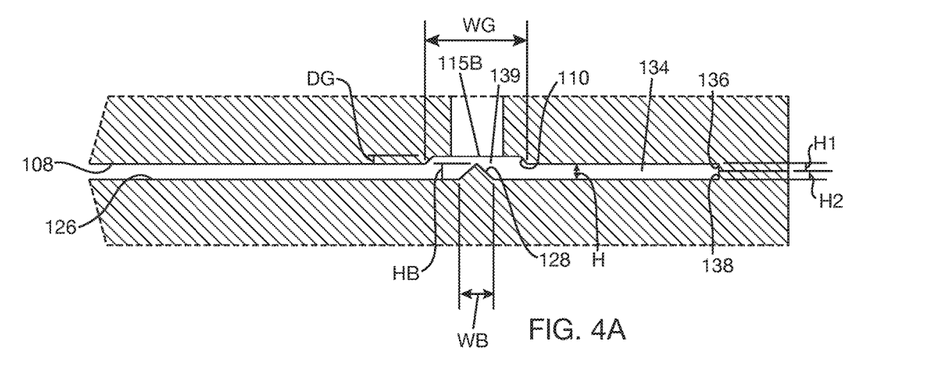
FIG. 4A shows an enlargement of circle 4A in FIG. 3B.

For illustration purposes, FIG. 4A shows an enlargement of the sealing areas of the mold 102 and plenum 120 according to one embodiment. The clearance of the profiled sealing gap 139 is determined by the dimensions of the sealing profiles 110, 128 and the height of the gap 134 between the sealing surfaces 108, 126. In one embodiment, the dimensions of the sealing profiles 110, 128 and the height of the gap 134 may be selected such that there will be no interference between the sealing profiles 110, 128 in the closed position, non-forming state of the reforming apparatus 100. This will allow adequate clearance of the profiled sealing gap 139 such that the sheet material will not be sheared when wedged in the profiled sealing gap 139 in the closed position, forming state of the reforming apparatus 100.

For a groove-type sealing profile 110, the dimensions of the sealing profile that can be selected to avoid sealing profile interference include a cross-sectional width, WG, and a depth, DG. For a bump-type sealing profile 128, the dimension of the sealing profile that can be selected to avoid sealing profile interference include a cross-sectional width, WB, and a height, HB. The height, H, of the gap 134 can also be selected to avoid sealing profile interference. In one embodiment, the height, H, of the gap 134 can be set by the height, H1, of the rim 136 or the height, H2, of the rim 138, or the combined height, H1+H2, of the rims 136, 138. On the other hand, the height, H, of the gap 134 (in the closed position, non-forming state of the reforming apparatus 100) should not be greater than the thickness of the sheet material that will be formed in the reforming apparatus; otherwise, reliable sealing between the sheet material and each of the mold 102 and plenum 120 may not occur when the reforming apparatus 100 is in the closed position, forming state.

As an example, the depth DG of a groove-type sealing profile 110 may be in a range from 0.2 mm to 1 mm, and the height HB of a bump-type sealing profile 128 may be in a range from 0.5 mm to 1 mm. The width WG of a groove-type sealing profile 110 would typically be larger than the width WB of the bump-type sealing profile 128 and may depend in part on the width of the opening 115B (for vacuum). The height H of the gap 134 may be the same or slightly less than the height of the sheet material to be received between the mold 102 and plenum 120.

Figure 4B:
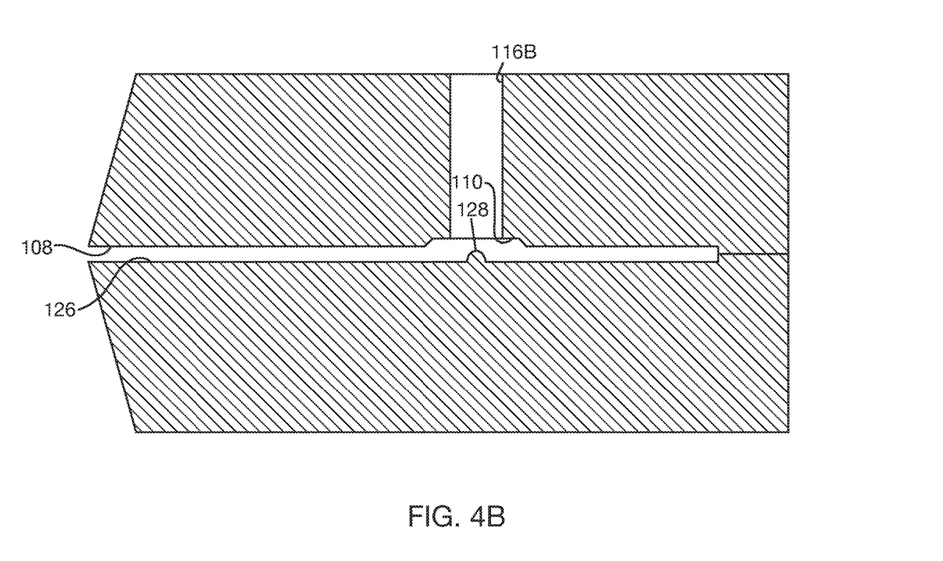
FIG. 4B shows a sealing bump having a round cross-sectional shape.
Figure 4C:
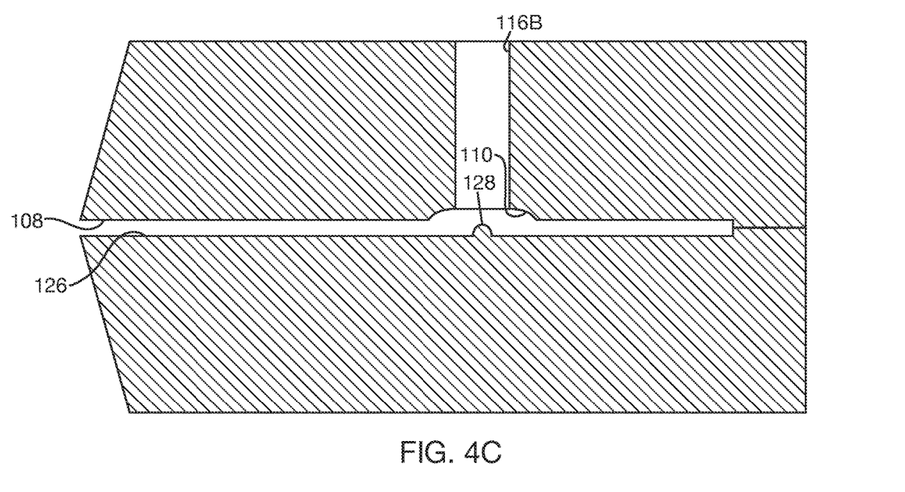
FIG. 4C shows a sealing bump and sealing groove having round cross-sectional shapes.
Figure 4D:
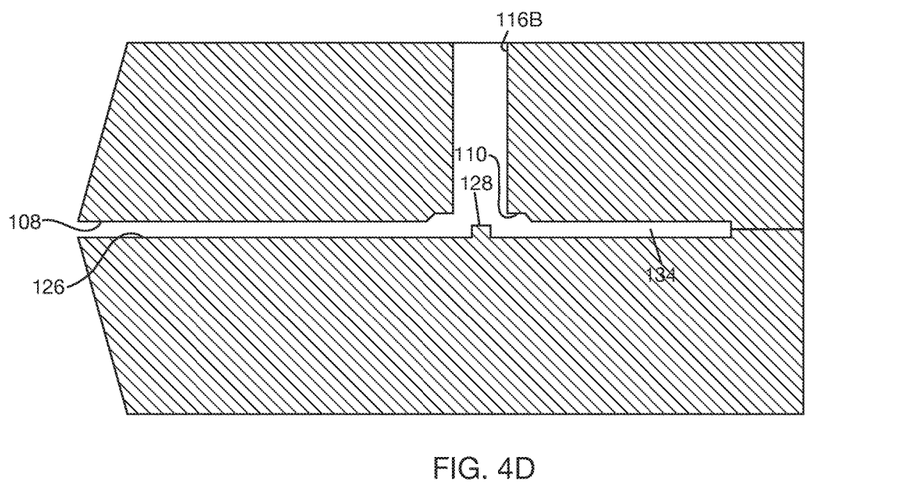
FIG. 4D shows a sealing bump having a square or rectangular cross-sectional shape.

The sealing profiles 110, 128 may have triangular cross-sectional shapes as shown in FIG. 4A. In the case of the groove-type sealing profile 110, the triangular shape is truncated to accommodate the vacuum opening 115B according to one embodiment. However, the sealing profiles 110, 128 are not limited to triangular cross-sectional shapes. For example, in FIG. 4B, a bump-type sealing profile 128 may have a round cross-sectional shape while a groove-type sealing profile 110 has a triangular cross-sectional shape. In FIG. 4C, both a bump-type sealing profile 128 and a groove-type sealing profile 110 may have round cross-sectional shapes. In FIG. 4D, a bump-type sealing profile 128 may have a square or rectangular cross-sectional shape while a groove-type sealing profile 110 has a triangular cross-sectional shape. Other shapes and shape combinations for the sealing profiles 110, 128 are possible and not limited to those shown in FIGS. 4A-4D.

Figure 5A:
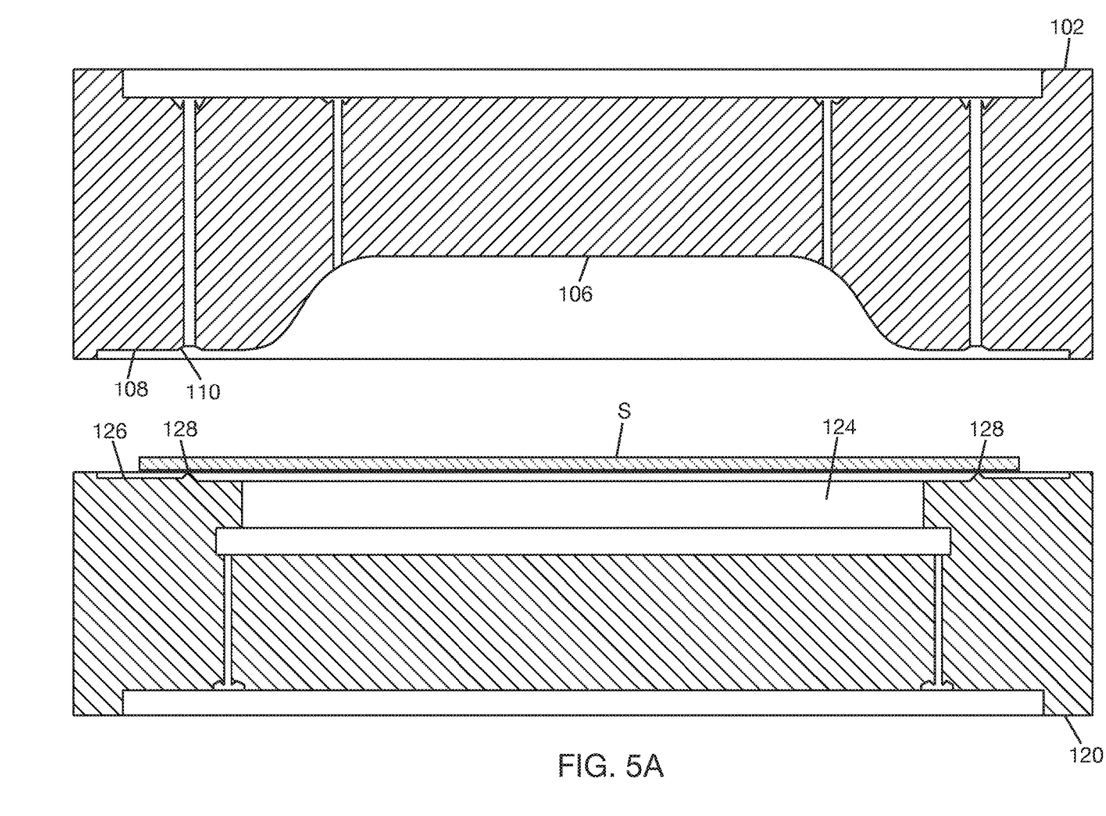
FIG. 5A shows a sheet material loaded onto a plenum.

FIGS. 5A-5F show how the reforming apparatus 100 can be used to form a sheet material into a desired shape. In FIG. 5A, the reforming apparatus 100 is in the open position, non-forming state, allowing a sheet material S to be loaded onto the plenum 120. The sheet material S sits on the bump-type sealing profile 128 formed on the sealing surface 126 of the plenum 120. The sheet material S may be made of glass, glass-ceramic, or other material that can be thermally reformed. The sheet material S will be relatively hot when loaded onto the plenum 120, e.g., at a temperature at which the sheet material S can be reformed by vacuum forming and/or pressure forming without breakage. In one embodiment, the sheet material S is made of glass or glass-ceramic, and a temperature of the sheet material S when loaded onto the plenum 120 is between an annealing and softening point of the sheet material. Once the sheet material S is loaded onto the plenum 120, the apparatus 100 should be closed quickly to prevent the sheet material S from getting too cold before it is formed into a desired shape. (It should be noted that if the locations of the sealing profiles are reversed such that the bump-type sealing profile is on the mold and the groove-type sealing profile is on the plenum, then the sheet material S can be loaded onto the mold instead.)

Figure 5B:
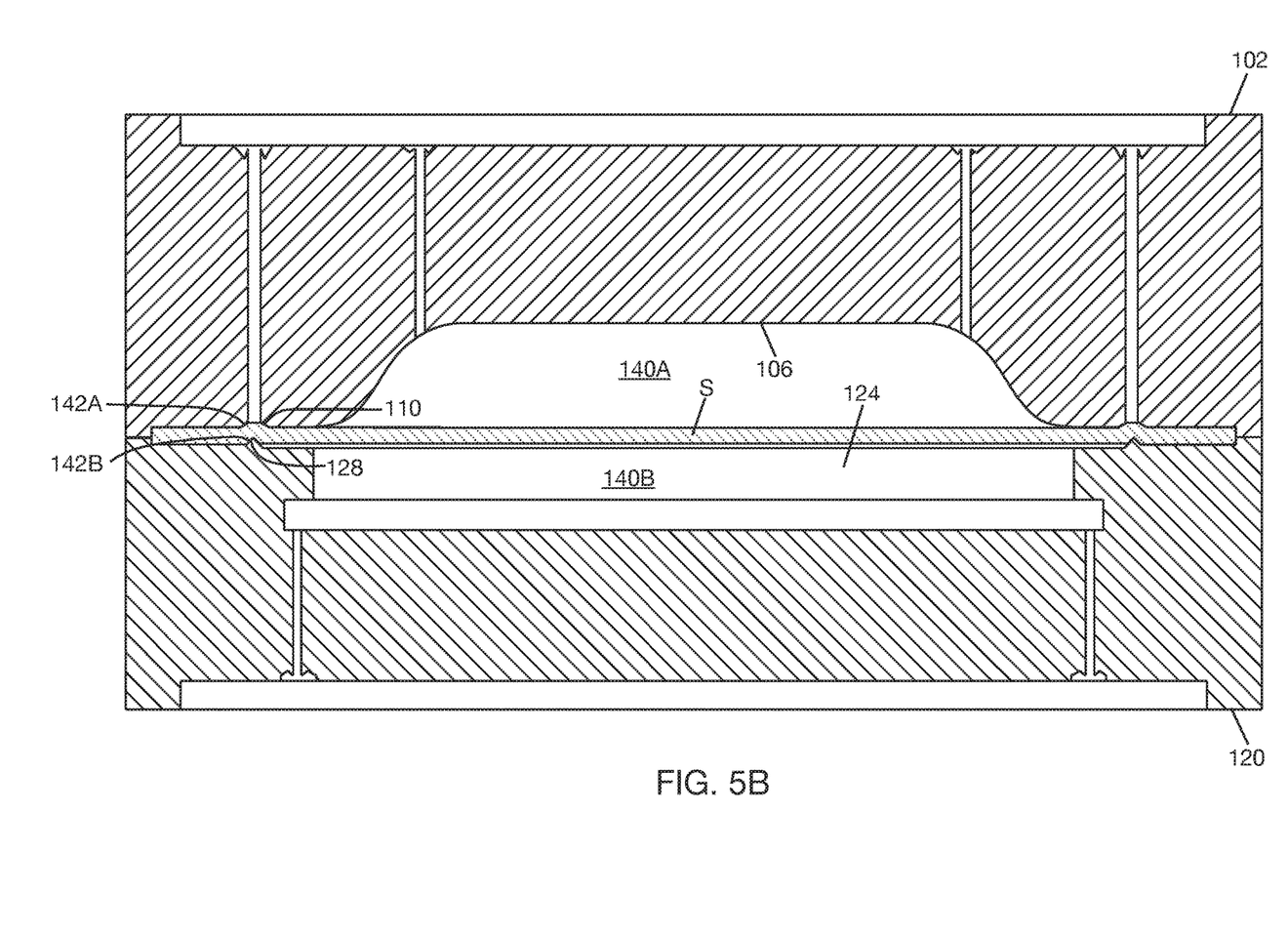
FIG. 5B shows a mold closed around the plenum and sheet material of FIG. 5A.

FIG. 5B shows the mold 102 closed against the plenum 120, with the sheet material S between the mold 102 and the plenum 120. A portion of the sheet material S is wedged into the profiled sealing gap (139 in FIG. 3B, 4A) created by the opposed sealing profiles 110, 128. This results in a direct seal 142A between the mold 102 and the sheet material S and a direct seal 142B between the sheet material S and the plenum 120. The direct seals 142A, 142B are formed simultaneously with closing of the mold 102 against the plenum 120. The direct seal 142A creates a forming area 140A adjacent to the mold 102 (or between the mold surface 106 and sheet material S) that can be used for vacuum forming of the sheet material S. The direct seal 142B creates a forming area 140B adjacent to the plenum 120 (or between the plenum chamber 124 and sheet material S) that can be used for pressure forming of the sheet material S. The direct seals 142A, 142B will prevent, or highly reduce, leakage from the forming areas 140A, 140B. Leakage, if not prevented, can result in localized cooling of the sheet material S. In the case of glass or glass-ceramic sheet material, any such localized cooling could result in breakage of the material. On the other hand, the direct seals 142A, 142B will allow a desired pressure level in the plenum 120 and a desired vacuum level in the mold 102 to be achieved quickly and efficiently. Also, the direct seals 142A, 142B will allow use of higher pressures and deeper vacuum for forming of the sheet material S, use of fast re-pressurization and de-pressurization in the forming, and will result in faster cycle time, e.g., between 4 and 12 seconds depending on the complexity of the shape being formed.

Figure 5C:
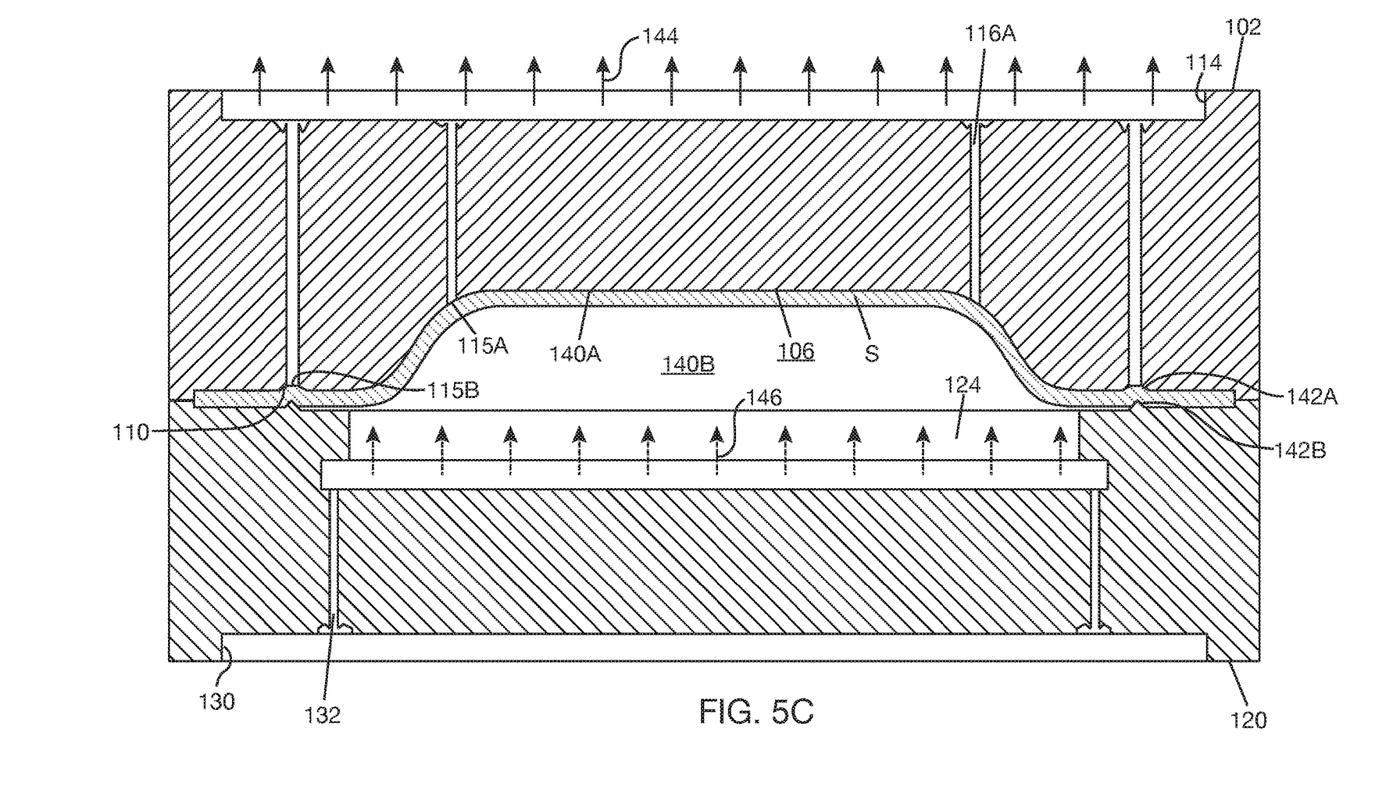
FIG. 5C shows the sheet material of FIG. 5B conformed to a mold surface.

FIG. 5C shows vacuum being drawn, as indicated by arrows 144, from the forming area 140A to pull the sheet material S against the mold surface 106 (the forming area 140A is between the mold surface 106 and the opposing surface of the sheet material S, as shown in FIG. 5B). The vacuum is drawn through the flow network formed by the chamber 114, channel(s) 116A, and opening(s) 115A. Vacuum may also be drawn from between the sheet material S and the sealing profile 110 to pull the sheet material S against the sealing profile 110 and thereby reinforce the direct seal 142A. In this case, vacuum may be drawn through the flow network formed by the chamber 114, channel(s) 116B, and opening(s) 115B.

FIG. 5C also shows pressurized gas being fed, as indicated by arrows 146, to the forming area 140B. The pressurized gas is fed to the forming area 140B through the flow network formed by the chamber 124, channel(s) 132, and chamber 130. The pressurized gas can be pressurized air or another gas that is inert relative to the sheet material S, such as, for example, nitrogen. The pressurized gas in the forming area 140B will act on the sheet material S, forcing the sheet material S against the mold surface 106.

The forces applied to the sheet material S by vacuum and pressurized gas will assist in fully conforming the sheet material S to the mold surface 106. Vacuum and pressurized gas may be applied simultaneously or separately. Preferably, vacuum and pressurized gas are applied simultaneously to achieve full conformance of the sheet material S to the mold surface 106 in the least amount of time.

Figure 5D:
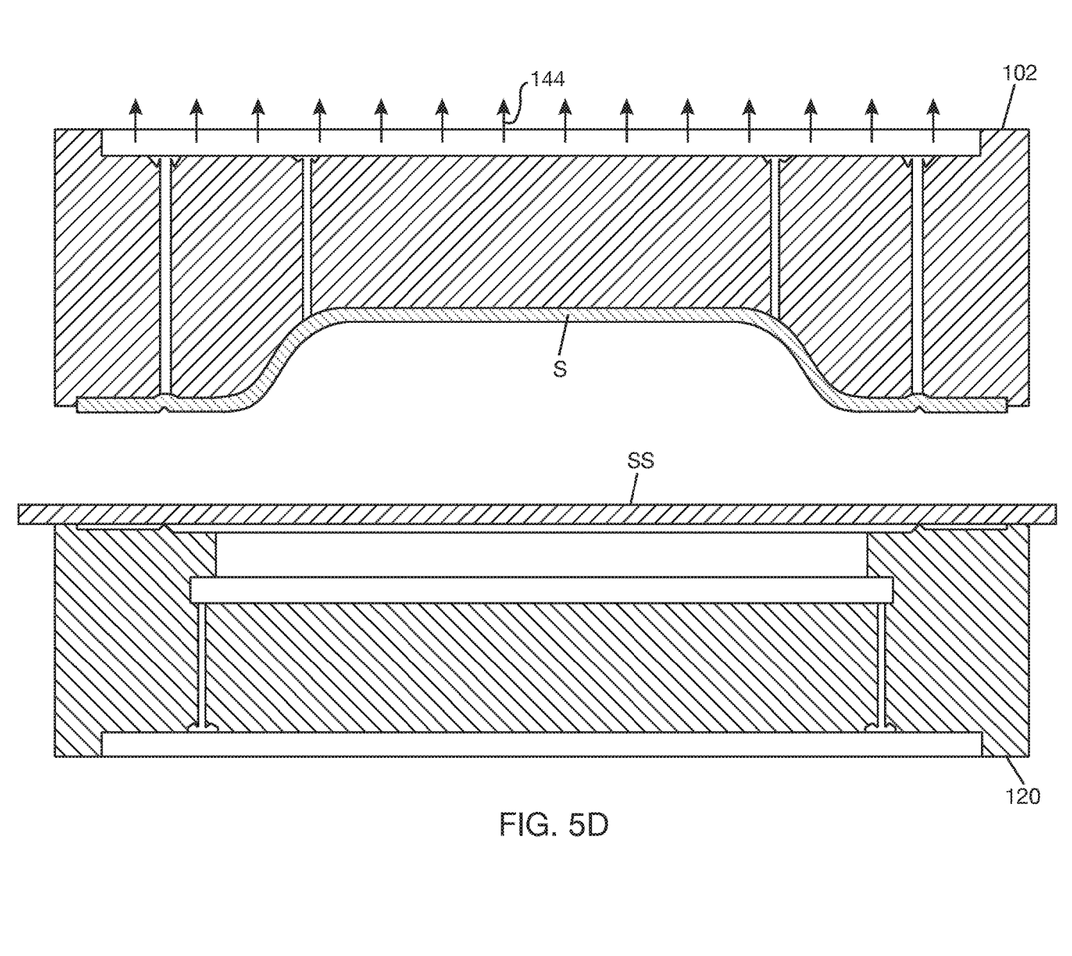
FIG. 5D shows the mold removed from the plenum with the shaped sheet material attached to the mold.

After the sheet material S has been fully conformed to the mold surface 106, the pressurized gas can be released, and the mold 102 can be removed from the plenum 120 (i.e., the reforming apparatus can be opened), as shown in FIG. 5D. The vacuum in the mold 102 can be maintained to keep the shaped sheet material S clamped to the mold surface 106, as shown in FIG. 5D.

Figure 5E:
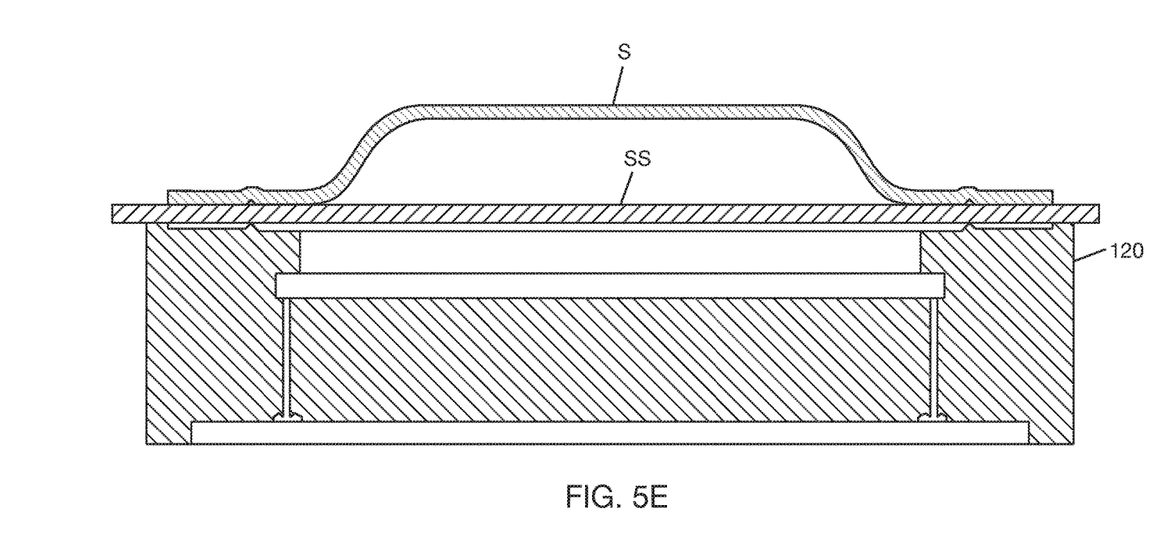
FIG. 5E shows the shaped sheet material on a support substrate on the plenum.
Figure 5F:
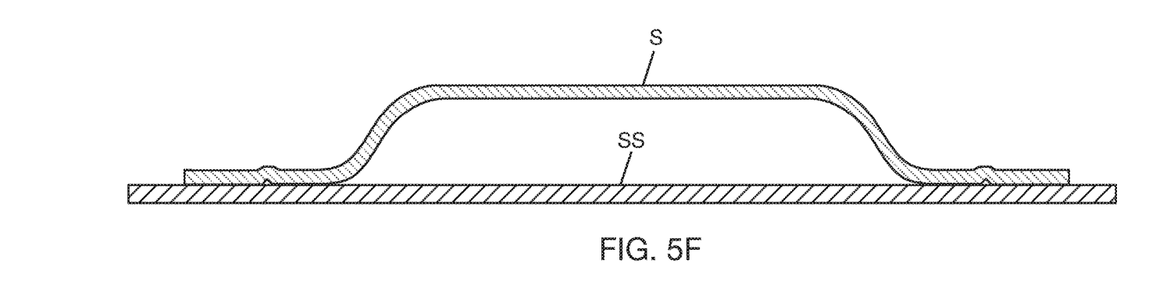
FIG. 5F shows the shaped sheet material and support substrate removed from plenum.

FIG. 5D shows a support substrate SS placed on the plenum 120, below the shaped sheet material S. FIG. 5E shows the vacuum removed from the mold 102, allowing the shaped sheet material S to drop onto the support substrate SS on the plenum 120. The support substrate SS can be used to transport the shaped sheet material S away from the plenum 120, as shown in FIG. 5F.

The reforming apparatus 100 can be used in a system for mass production of shaped articles, such as, for example, the system disclosed in U.S. Pat. No. 8,573,005 ('005 patent) to Dannoux et al. The system of the '005 patent includes a preheating section, followed by a heating section, followed by a forming section, followed by a cooling section. While the sheet material is being heated in the heating section, the reforming apparatus 100 can be in the closed position, non-forming state (as shown in FIG. 3B). When it is time to eject the sheet material from the heating section, the reforming apparatus 100 can be opened (as shown in FIG. 3A). The '005 patent teaches ejection of the sheet material by pneumatic ram force. If the plenum 120 is appropriately positioned relative to the heating section, the sheet material can be ejected from the heating chamber directly onto the plenum 120 (as shown in FIG. 5A). Then, the mold 102 can be closed against the plenum 120 such that the sheet material is wedged in the profiled sealing gap between the mold 102 and plenum 120. Once the direct seals are formed between the sheet material and the mold 102 and plenum 120, vacuum and pressure forming of the sheet material can commence.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An apparatus for reforming a sheet material, comprising:
   a mold having a first sealing surface including a first sealing profile; and
   a plenum having a second sealing surface including a second sealing profile, the plenum and mold being movable to a closed position in which the first sealing profile and the second sealing profile are in opposed relation and together define a profiled sealing gap between the first and second sealing surfaces;
   wherein when the sheet material is wedged into the profiled sealing gap in the closed position of the plenum and mold, a first direct seal is formed between the first sealing profile and the sheet material and a second direct seal is formed between the second sealing profile and the sheet material, and
   one of the first and second sealing profiles is in the form of a groove in the respective sealing surface and the other of the first and second sealing profiles is in the form of a bump in the respective sealing surface.

2. The apparatus of claim 1, wherein there is no interference between the first and second sealing profiles in the closed position of the plenum and mold.

3. The apparatus of claim 2, wherein there is a gap between the first and second sealing surfaces in the closed position of the plenum and mold, and wherein a height of the gap is selected such that there is no interference between the first and second sealing profiles in the closed position of the plenum and mold.

4. The apparatus of claim 3, wherein at least one of the plenum and mold comprises a rim circumscribing a respective one of the first and second sealing surfaces, and wherein the height of the gap is set by the height of the rim.

5. The apparatus of claim 1, wherein a first forming area is defined adjacent to the mold and a second forming area is defined adjacent to the plenum in the closed position of the plenum and mold.

6. The apparatus of claim 5, wherein the first direct seal seals a periphery of the first forming area, and wherein the second direct seal seals a periphery of the second forming area.

7. The apparatus of claim 6, wherein the mold comprises a first flow network for drawing vacuum from the first forming area, and wherein the plenum comprises a second flow network for feeding pressurized gas to the second forming area.

8. The apparatus of claim 6, wherein the first sealing profile comprises an opening in communication with the first flow network.

9. The apparatus of claim 1, wherein each of the first and second profiles has a triangular, round, square, or rectangular cross-sectional shape.

* * * * *